J. BUTERA AND G. SORCE.
SIGNALING DEVICE.
APPLICATION FILED MAY 31, 1921.

1,392,048.

Patented Sept. 27, 1921.

INVENTORS
Joseph Butera
Gaetano Sorce
BY John A. Naismith
ATTORNEY

UNITED STATES PATENT OFFICE.

JOSEPH BUTERA AND GAETANO SORCE, OF SAN JOSE, CALIFORNIA.

SIGNALING DEVICE.

1,392,048.  Specification of Letters Patent.   Patented Sept. 27, 1921.

Application filed May 31, 1921. Serial No. 473,621.

*To all whom it may concern:*

Be it known that we, JOSEPH BUTERA and GAETANO SORCE, subjects of the King of Italy, and residents of San Jose, in the county of Santa Clara and State of California, have invented certain new and useful Improvements in Signaling Devices, of which the following is a specification.

Our invention relates to a device for mounting upon an automobile whereby the driver thereof may indicate to the drivers of other machines and to pedestrians the course he is going to pursue; that is whether he is going to continue to drive straight ahead, or turn to the right or left, or stop.

It is the object of our invention to provide a device of the character indicated that will be positive in action, highly efficient in its practical application, capable of being rendered visible by day or night, compact in form, and simple in construction and operation.

In the drawing,—

Figure 1:
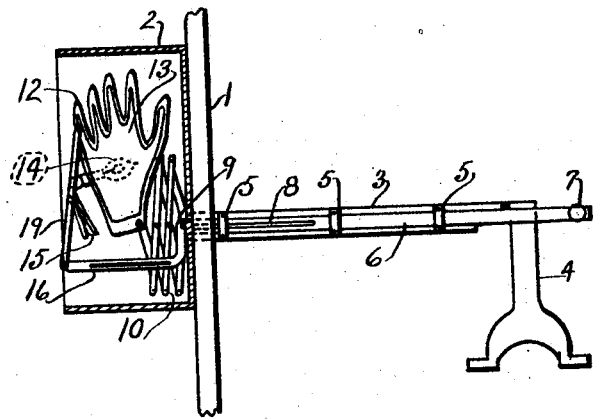
Figure 1 is a rear elevation of one embodiment of the complete device.
Figure 2:
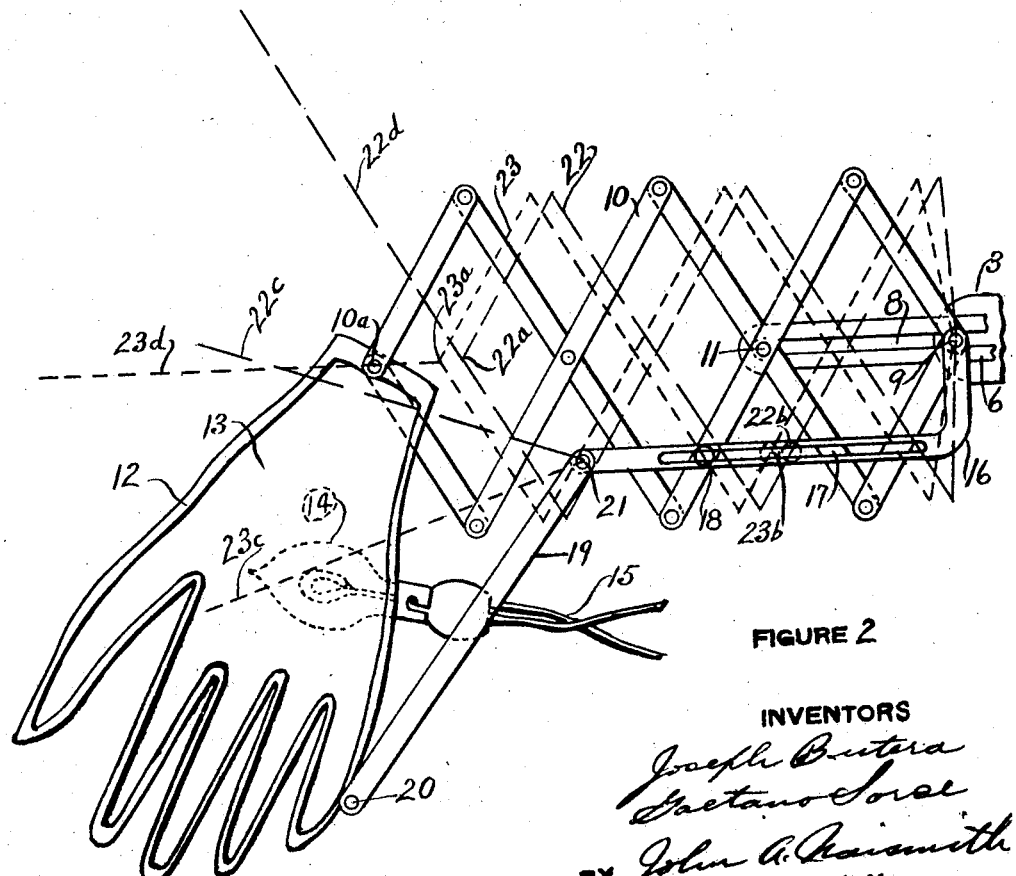
Fig. 2 is an enlarged detail elevation of the signal operating mechanism.

Referring more particularly to the drawing, 1 indicates a side bar of a windshield having a box 2 (shown in section) mounted thereon. At 3 is a horizontally arranged supporting arm extending into the box 2 and provided with a means as at 4 for a rigid connection to the automobile frame.

Mounted to reciprocate on arm 3 and in guides 5 is a bar 6 provided with a knob 7 and having a slot 8 formed therein as shown. Slot 8 engages a pin 9, fixedly mounted on the end of arm 3 so that the said bar 6 may be moved backward and forward relative to said pin.

At 10 is shown a pantograph bracket pivotally mounted at its inner end to pin 9 and pivotally mounted at its second joint to a pin 11 on the end of bar 6. On the outer end 10ª of bracket 10 is pivotally mounted an indicator element as a hand 12, the same being fitted with one or more transparent faces as at 13 and having an electric light bulb as 14 mounted therein and connected by wires 15 to a generator not shown.

At 16 is shown a guide member mounted on pin 9, and provided with a slot as shown at 17, engaging a pin 18 set in one of the cross-bars of the bracket 10 whereby it is held in parallel relation thereto. At 19 is a link pivotally connected to hand 12 as at 20 and to the end of member 16 as at 21.

The device described is normally nested in box 2 as shown in Fig. 1. If it is desired to display the signal "turn right" then bar 6 is forced outwardly a distance, thereby through its attachment to the bracket at 11 forcing the said bracket to expand a distance as indicated in dash lines at 22. This expansion of bracket 10 moves the pivotal point 10ª to the position 22ª, the pin 18 to position 22ᵇ, and the link 19 to position 22ᶜ, thereby forcing the hand 12 to take the position indicated by the central line 22ᵈ. This action is positive because guide member 16 is fixed in the position shown, so that as bracket 10 is expanded the point 20 must travel in the arc of a circle about point 21 as a center, and of course a slight movement of point 10ª will effect a relatively great movement of point 20.

If it is desired to extend the hand 12 in a horizontal position to indicate "turn left," then the bracket 22 is extended to position 23, the pivotal point 10ª moving to 23ª, the pin 18 to 23ᵇ, and the link 19 to the position 23ᶜ, thereby forcing the hand 12 to take the position indicated by center line 23ᵈ.

A further extension of bracket 10 carries it to the position shown in solid lines, the "stop" position, and withdrawing or collapsing the bracket 10 moves the hand 12 back through the several positions to its normal position in the box 2.

It may now be seen that we have provided a simple, compact, positive and highly efficient device for effecting the result desired.

It is to be understood, of course, that changes in form, construction and method of operation may be made within the scope of the appended claims, as for instance, any desired mechanism may be provided for reciprocating bar 6.

We claim:—

1. A signal comprising a supporting arm, a pantograph bracket mounted thereon, a signal device mounted on said bracket, means for expanding said bracket, and an additional connection between said device and supporting arm whereby said device is caused to rotate about its connection to said bracket upon the expansion thereof.

2. A signal comprising a supporting arm, a pantograph bracket mounted thereon, an operating bar slidably mounted on said arm, and attached to said bracket to expand or contract the same, a signal device mounted on said bracket, and an additional connection between said device and said supporting arm whereby the expansion of said bracket will effect an angular adjustment of said device.

3. A signal comprising a support, an operating arm slidably mounted thereon, a pantograph bracket mounted on said support and connected to said arm and operated thereby, a signal device pivotally mounted on said bracket at one end, an arm mounted on said support in substantially parallel relation to the axis of said bracket, and a link pivotally mounted upon said last mentioned arm and the outer portion of said device.

4. A signal comprising a support, a signal device, means pivotally connected to one end of said device and mounted on said support for extending or retracting the said end of the device and means connecting said support and the other end of said device whereby the extension or retraction of the first named end of the device will cause a pivotal movement of the device about said first named means.

5. A signal comprising a support, an operating arm slidably mounted thereon, a pantograph bracket mounted on said support and connected to said arm and operated thereby, a signal device pivotally mounted on said support in substantially parallel relation to the axis of said bracket, a pin mounted on said bracket and slidably engaging said first mentioned arm, and a link pivotally connecting said last mentioned arm and the outer portion of said signal device.

JOSEPH BUTERA.
GAETANO SORCE.